No. 737,619. PATENTED SEPT. 1, 1903.
A. M. HARRISON.
SHAFT CONNECTING DEVICE FOR CHANGE GEARS.
APPLICATION FILED JAN. 28, 1903.
NO MODEL.
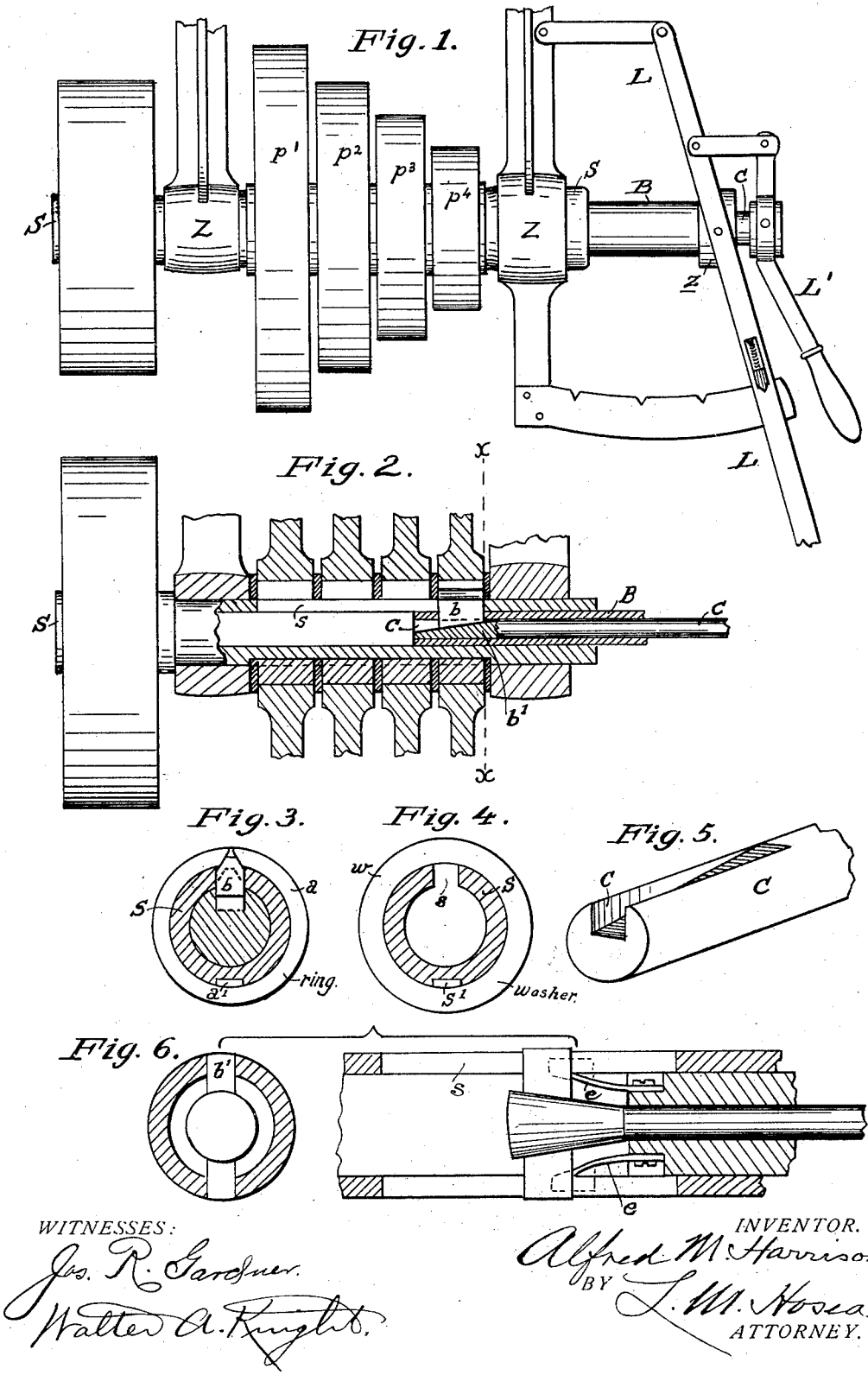
WITNESSES:
Jos. R. Gardner.
Walter A. Knight.
INVENTOR.
Alfred M. Harrison
BY L. M. Hosea
ATTORNEY.

No. 737,619.　　　　　　　　　　　　　　　　　　　　　　　　Patented September 1, 1903.

UNITED STATES PATENT OFFICE.

ALFRED M. HARRISON, OF CINCINNATI, OHIO, ASSIGNOR TO THE KING MACHINE TOOL COMPANY, OF CINCINNATI, OHIO, A CORPORATION OF OHIO.

SHAFT-CONNECTING DEVICE FOR CHANGE-GEARS.

SPECIFICATION forming part of Letters Patent No. 737,619, dated September 1, 1903.

Application filed January 28, 1903. Serial No. 140,953. (No model.)

*To all whom it may concern:*

Be it known that I, ALFRED M. HARRISON, a citizen of the United States, residing at Cincinnati, in the county of Hamilton and State of Ohio, have invented new and useful Improvements in Shaft-Connecting Devices for Change-Gears, of which the following is a specification.

My invention relates to mechanism for connecting any one of a series of gears or pulleys with a driving or driven shaft with a view to changes of speed, &c., its object being to effect such alternate connection with certainty and despatch and without sudden jars and to provide a mechanism for this purpose that shall be simple of construction, easy of manipulation, and adapted to use with all classes of machine-tools and other machinery.

To this end my invention consists of the parts and the constructions and combinations of parts, substantially as I will hereinafter describe and claim.

The general construction and the precise form and nature of the friction devices employed may vary in the mechanism without departing from the essential spirit of my invention. In the present illustration I have shown a hollow-sleeve carrier adjustable longitudinally within the hollow shaft, a radially-movable wedge-block carried and guided in a radial slot of the carrier and through an elongated slot of the shaft and adjustable by the movements of the carrier to the zone of either pulley or gear, and a conical-ended mandrel operative within the carrier to advance the wedge-block between the terminals of a friction-ring seated on the shaft in the zone of the pulleys and expanded thereby into the bore of the pulleys, together with a construction of parts tending to simplicity and economy of production and maintenance.

Mechanism embodying my invention is illustrated in the accompanying drawings, in which—

Figure 1 is a general side elevation of my improvement; Fig. 2, a vertical section in an axial plane, showing the construction and relation of parts; Fig. 3, a cross-section in the plane $x$, indicated in dotted line of Fig. 2; Fig. 4, a view of one of the separating-washers in position upon the shaft; Fig. 5, a perspective view of the end of the mandrel, showing the inclined surface for actuating the wedge-block; Fig. 6, a cross-section and axial section showing a modification in which the friction-ring is omitted and the wedge-blocks substituted by radial thrust-blocks actuated by the mandrel.

Referring now to the drawings, S designates a hollow shaft rotating in bearings Z, and $p'$ $p^2$ $p^3$ $p^4$ a series of loose pulleys or gears mounted thereon in adjacent relation and to be engaged with the shaft S alternately, as occasion may require. Each pulley is bored larger than the shaft S, the intervening annular space being occupied by a split friction-ring $a$ with beveled ends opening inward, as shown in Fig. 3. The shaft S is at one side provided with a radial slot $s$, longitudinally extended to the limits of the space occupied by the pulleys $p'$ $p^2$, &c. At the opposite side of the shaft S is an exterior shallow groove $s'$, longitudinally extended between the aforesaid pulley limits and outward to one end of the shaft. There are next provided a number of annular washers $w$ to fit on the shaft between the gears $p'$ $p^2$, &c., and may be used between the outer pulleys and the bearings Z. The washers are not absolutely necessary, but serve the useful purpose, among others, of so separating the pulley zones as to prevent an accidental engagement of two pulleys at once by failure to properly adjust the carrier, as will be more fully explained later.

The friction-rings $a$ are formed with tongues $a'$, projecting inwardly to engage in the exterior groove $s'$ of the shaft, and are thus held in constant rotative engagement with the shaft, and the beveled opening between the terminals of the split rings is always held truly alined in relation to the slot $s$. The split rings $a$ are thus, in relation to the shaft S, part of the shaft, upon which the gears $p'$ $p^2$, &c., may ordinarily run loosely; but when expanded they frictionally engage the gears with the shaft S.

Within and projecting through the axial opening of the shaft S is fitted a concentric sleeve B, termed a "carrier," which near its inner end is provided with a radial slot of corresponding width, the rectangular dimensions of the slot $s$ of the shaft S, through which plays a block $b$, having its outer end wedge-shaped, as indicated in Fig. 3, to engage between and spread apart the beveled terminals of the split ring $a$. The opposite end is inclined, as in Fig. 2, to rest upon the oppositely-inclined bottom of a chamfered groove C of the mandrel $c$, (see Figs. 2 and 5,) so that when the mandrel is advanced the wedge-block $b$ is advanced outward and the ring $a$ expanded, and when the mandrel is receded said block is allowed to be pushed inward by the normal retraction of the ring $a$.

Each adjacent gear $p'$ $p^2$, &c., is provided with a friction-ring $a$ of the same size, construction, and relative arrangement throughout the series, and it will be manifest that in the adjustment of the expanding-block $b$ from one to another of the gears the block must pass under the washers $w$ and be properly adjusted to the zone or space between two washers before it can act upon an expansion-ring $a$; otherwise it would engage a washer $w$ and be thereby prevented from action, so that engagement of two gears at a time is prevented.

The carrier B is controlled and adjusted by a yoke-lever L, pivoted immediately to the frame or an immovable portion of the mechanism and engaging a collar $z$, held in a circumferential groove at the projecting end of the carrier B. A supplemental lever L', similarly pivoted to the main lever L, engages in a similar manner to the projecting end of the mandrel C.

The operation is as follows: Figs. 1 and 2 indicate the positions of the parts when the gear $p^4$, the last of the series, stands engaged with the shaft. To disengage it, the mandrel $c$ is receded by the supplemental lever L' and its immediate connections, thus allowing the wedge-block $b$ to drop inward out of the expanding connection with the split ring $a$, carried by the pulley $p^4$, and said ring by its contraction aids in such release. If now it is desired to engage another gear, as $p^3$, the carrier is moved forward by its lever L (the wedge-block $b$ being still in its withdrawn position and passing beneath the intervening washers $w$) to the proper position, and the appropriate ring $a$ is expanded by manipulation of the supplemental lever L', moving the mandrel C inward, thus forcing the wedge-block $b$ outward between the beveled terminals of the ring.

In the modified construction shown in Fig. 6 the expansion-rings are dispensed with. The gears seated directly on the shaft and blocks $b'$ are forced outward by a conical mandrel against the gear to be engaged. In this I also show the blocks carried by and upon spring-arms $e$, projecting beyond the carrier, whereby they are held resiliently and are retracted thereby when out of use.

I claim as my invention and desire to secure by Letters Patent of the United States—

1. The combination of a shaft, a loose pulley operating concentrically in relation to said shaft, a concentric sleeve or carrier adjustable longitudinally in relation to said shaft, an expansion-ring arranged in the zone of the pulley or gear concentrically in relation to the pulley, carrier and shaft; and a wedge-block carried in radially through the carrier, and means for operating the wedge-block outwardly between the terminals of the ring to expand the same in the axial perforation of the pulley and engage the same rotatively with the shaft.

2. In combination with a hollow shaft and a plurality of loose pulleys or gears in adjacent relation thereon; a corresponding plurality of expansible friction-rings seated upon the shaft within the axial apertures of the pulleys respectively: a carrier-sleeve adjustable longitudinally within the shaft and a wedge-block carried in and by the carrier to the several zones of the pulleys or gears, and means for operating said wedge-block radially outward between the contiguous terminals of the rings respectively, substantially as and for the purpose set forth.

3. In an engaging device of the character indicated, the combination, with the shaft, the plurality of loose gears or pulleys, the expansion-rings, the wedge-block adjustable to the zones of the gears or pulleys alternately, the washers, $w$, interposed between each two adjacent expansion-rings, and means for operating the wedge-block outwardly between the washers to engage the expansion-rings, substantially as and for the purpose set forth.

4. In an engaging device of the character indicated the combination of the slotted shaft; the loose pulleys or gears; the sleeve or carrier, the mandrel having an inclined surface and movable longitudinally within the carrier, and the block or blocks, $b$, operated radially through the carrier and shaft by means of its seat upon the inclined surface of the mandrel, substantially as and for the purpose set forth.

5. In an engaging device of the character indicated, the combination of the shaft, the pulleys thereon, the carrier adjustable longitudinally in relation thereto, the wedge-block, the mandrel adjustable longitudinally in relation to the carrier, the lever, L, having a yoke-and-collar connection with the carrier, and the supplemental lever, L', having a similar connection with the mandrel, substantially as and for the purpose set forth.

In testimony whereof I have hereunto set my hand in presence of two subscribing witnesses.

ALFRED M. HARRISON.

Witnesses:
WALTER A. KNIGHT,
JOSEPH R. GARDNER.